Aug. 13, 1968

F. A. BEZLAJ ETAL 3,396,603

HAND POWER HANDBRAKE

Filed April 15, 1966

Inventors:
Frank A. Bezlaj
Jerome J. Panko
By Bair, Freeman & Molinare
Attys.

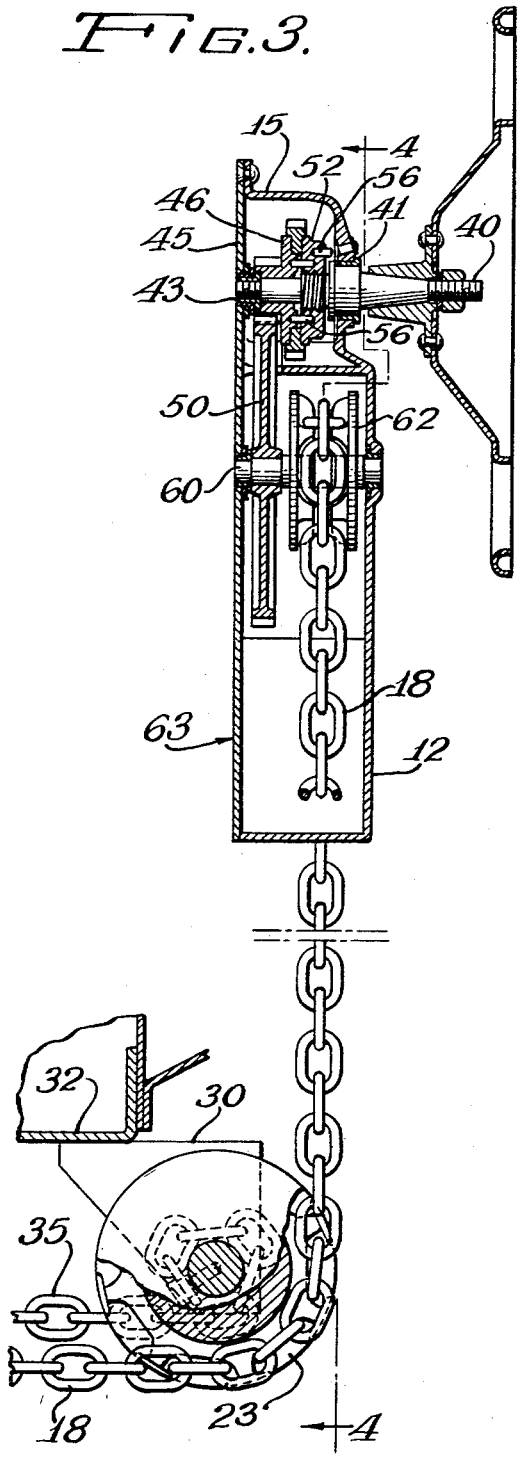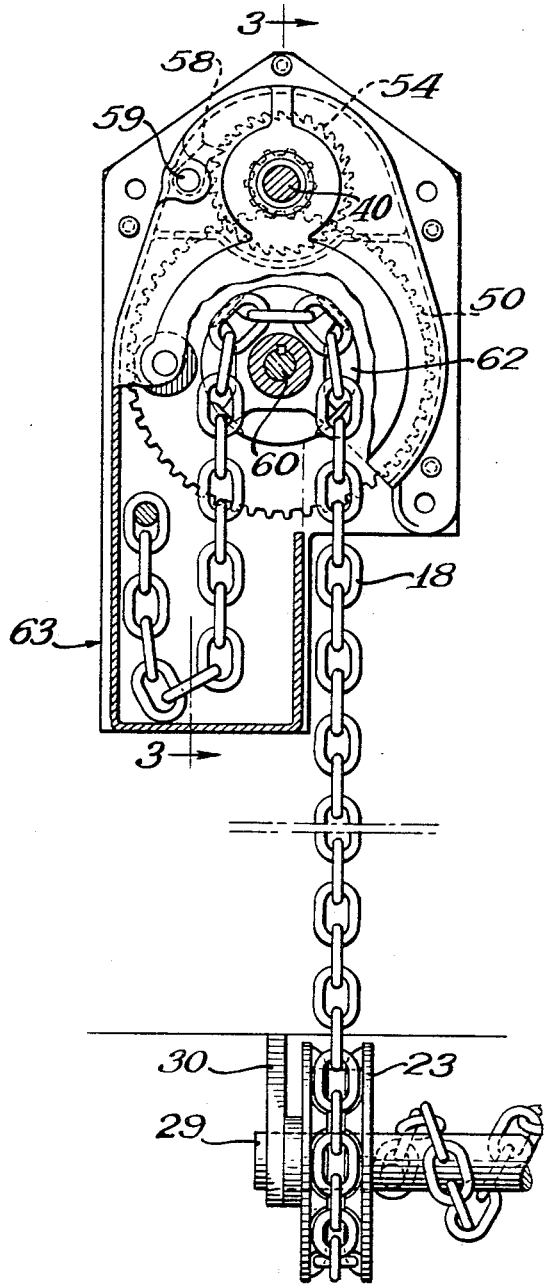

Aug. 13, 1968

F. A. BEZLAJ ETAL 3,396,603

HAND POWER HANDBRAKE

Filed April 15, 1966

Inventors:
Frank A. Bezlaj
Jerome J. Panko
By Bair, Freeman & Molinare
Attys.

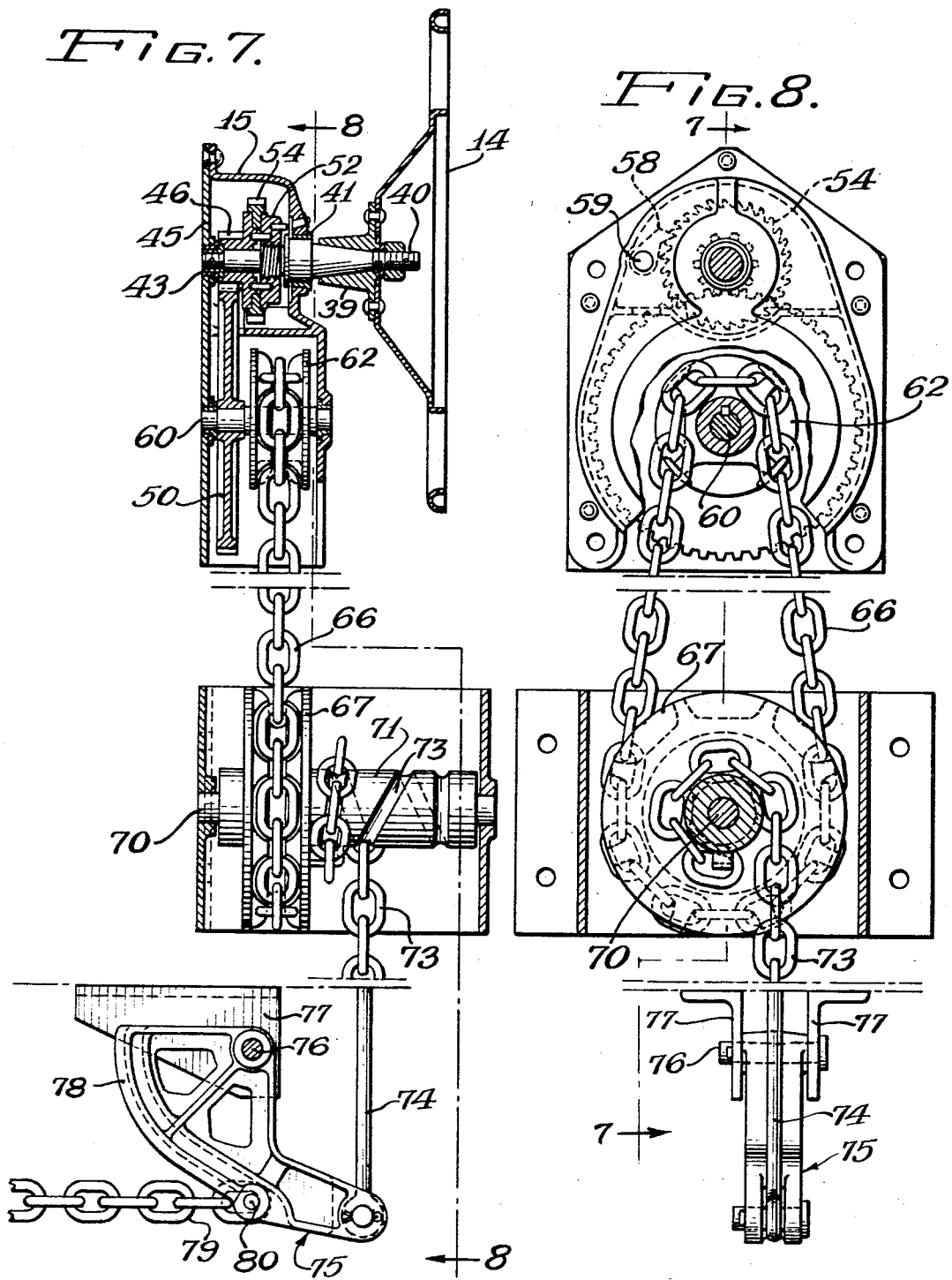

United States Patent Office 3,396,603
Patented Aug. 13, 1968

3,396,603
HAND POWER HANDBRAKE
Frank A. Bezlaj, Matteson, and Jerome J. Panko, Harvey, Ill., assignor to Unarco Industries, Inc., a corporation of Illinois
Filed Apr. 15, 1966, Ser. No. 542,909
5 Claims. (Cl. 74—506)

ABSTRACT OF THE DISCLOSURE

A mechanism for operating a railway brake. An actuating chain is connected to the brake. A chain drum and a first chain sprocket are mounted together for mutual rotation, the chain sprocket having a substantially larger effective diameter than the chain drum. The chain sprocket windably receives the actuating chain. A rotatable hand wheel, a second chain sprocket and means for rotating the second chain sprocket in response to rotation of the hand wheel are also provided. A second chain engages both the first and second chain sprockets so that rotation of the second sprocket rotates both the first sprocket and the drum to apply tension to the brake actuating chain and thereby to the brake.

---

This invention relates to an improved railway handbrake actuating arrangement.

Handbrake mechanisms of the type used on railway freight cars and the like are normally operated by applying tension to an actuating chain. The application of tension to the actuating chain operates a mechanism for causing the brake shoes to be drawn against the wheels to slow or stop the car. The tension applied to the actuating chain is directly related to the braking force applied to the wheels. Because of the superior characteristics of the recently developed high friction type "composition" brake shoes, it has been found necessary to include brakes on only four wheels of the car rather than eight. Although these composition shoes perform in a superior fashion at high speeds, it is necessary to apply substantially greater braking force to the composition shoes than is required with more conventional brake shoes to stop the car when it is moving slowly and to hold it in a standing position.

Tension is conventionally applied to railway brake actuating chains by manually turning a hand wheel. The torque applied to the hand wheel is amplified by a gear train and applied to a rotating drum which windably receives and tensions a brake actuating chain. Under "near static" conditions (below 3 miles per hour), existing handbrake mechanisms fail to supply adequate pulling tension to the actuating chain when composition shoes are substituted for conventional shoes. Because the breaking performance of composition shoes drops rapidly at slow speeds, braking at near static conditions with the combination of conventional tensioning mechanisms and composition shoes has been found to be inadequate.

Although it would be possible to increase cable tension by increasing the gear reduction ratios in the cable tensioning mechanism, this would necessitate a redesign and replacement of existing tensioning mechanisms. In the aggregate, replacing the existing cable tensioning mechanisms in all rolling stock wherein it is desired to use composition shoes would be extremely costly.

It is accordingly an object of the present invention to increase the amount of tension applied to a brake actuating chain in a railway handbrake system without requiring extensive modification or replacement of existing chain tensioning mechanisms.

It is a further object of the invention to provide improved braking characteristics in a railroad handbrake system by the provision of a novel arrangement for increasing actuating chain tension to permit the inclusion of high friction type composition brake shoes.

It is a still further object of the present invention to provide a handbrake arrangement characterized by its simple and inexpensive construction.

In a principal aspect, the present invention takes the form of an improved arrangement for applying pulling tension to a railway brake actuating chain. According to a first feature of the invention, a chain drum and a first chain sprocket are mounted together for mutual rotation. The chain drum is mounted to windably receive the brake actuating chain. The overall braking system is operated by a hand wheel rotatably mounted on the car. By turning the hand wheel, torque is applied to second chain sprocket. A second chain engaged with both the first and second chain sprockets causes rotation of both the first and second sprockets and the drum in response to rotation of the hand wheel. According to a further feature of the invention, the effective diameter of the first sprocket is substantially larger than the effective diameter of both the drum and the second sprocket. The principles of the present invention thus provides substantially increased pulling tension on the brake actuating chain without requiring an extensive modification of existing brake tensioning mechanisms.

These and other features of objects and advantages of the present invention may be more clearly understood through a consideration of the following detailed description. In the course of this description, reference will frequently be made to the attached drawings in which:

FIGURE 3 is a cross-sectional view taken along the lines 3—3 of FIGURE 4 and showing the internal components of the tensioning mechanism;

FIGURE 4 is a front view partially in cross-section along the lines 4—4 of FIGURE 3 showing the cable tensioning scheme contemplated by the invention;

FIGURE 7 is a cross-sectional view showing the internals of the gear train taken substantially along the lines 7—7 of FIGURE 8; and FIG. 8 is a front view of the arrangement shown in FIGURE 7.

Figure 1:
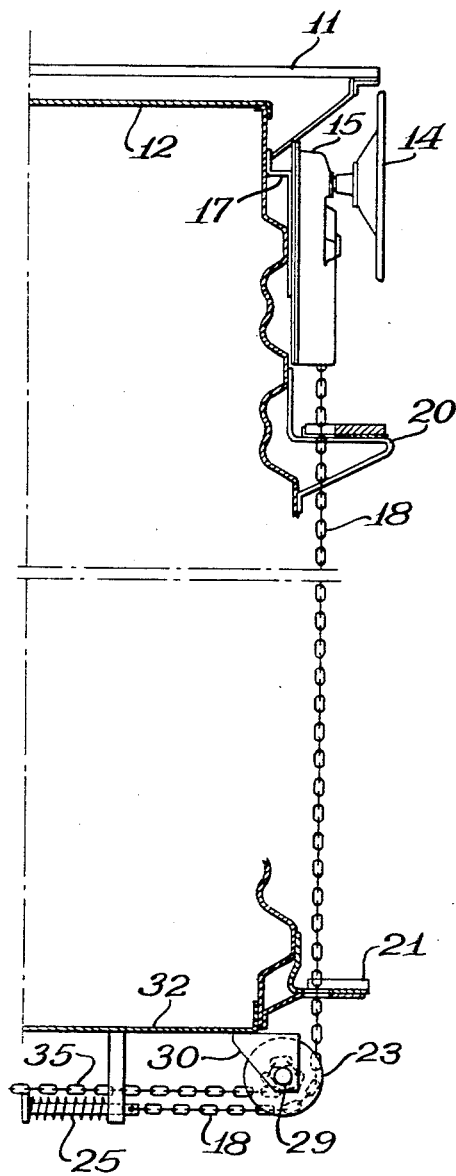
FIGURE 1 is a side view of a railway handbrake system embodying the principles of the invention showing the placement of the gear train mechanism and tension multiplier on the end of a freight car.
Figure 2:
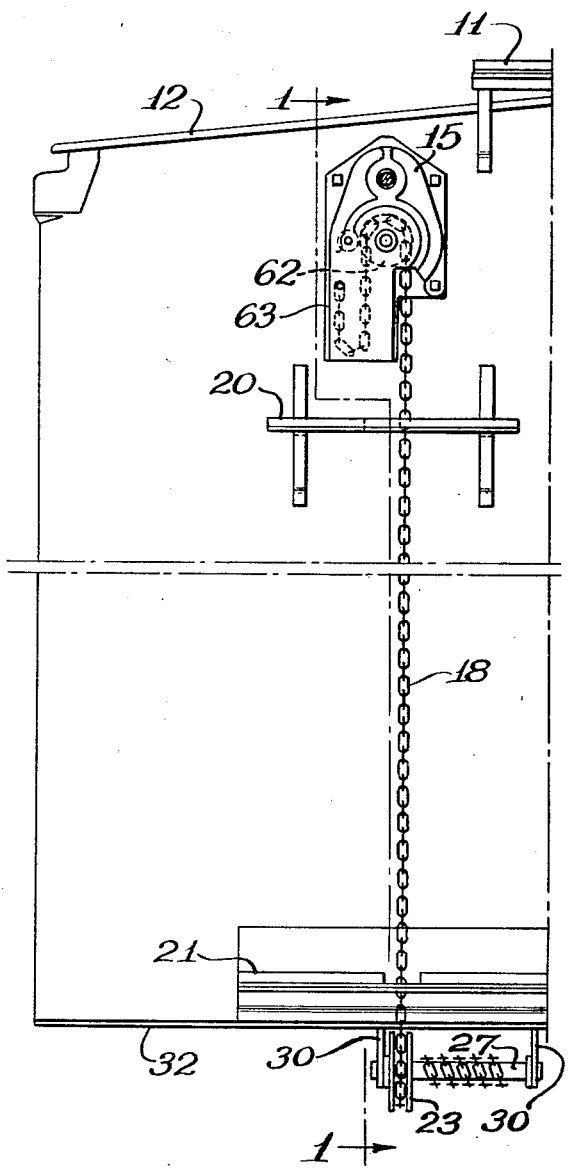
FIGURE 2 is an end view of the car and handbrake system shown in FIGURE 1.

The present invention contemplates increasing the amount of pulling tension supplied by a conventional handbrake chain tensioning arrangement. As shown in FIGURE 1 of the drawings, the handbrake tensioning mechanism according to the invention is mounted on the "frame" provided by the "brake" end of a freight car or the like. The car itself includes a running board shown generally at 11 which projects outwardly from the end of the car over the roof 12. A chain tensioning arrangement including a hand wheel 14 and a gear and clutch housing 15 is affixed to the upper portion of the car by means of a bracket arrangement 17. The bracket 17 allows firm mounting against the corrugated end surface of the car. Rotation of the hand wheel 14 in a clockwise direction tensions a first brake chain 18 which extends downwardly from the housing 15, passes through brake steps 20 and 21, and engages with the lower and outward quarter of a sprocket 23. An end portion of the cable 18 passes from the sprocket 23 in a horizontal direction and is affixed to the sliding rod or armature portion of a compression spring 25 which maintains tension on the chain 18. A chain drum 27 shown in FIGURE 2 is affixed to the sprocket 23 and serves as the axle for sprocket 23. Downwardly depending bracket members 30 mounted at their upper extremity to the floor 32 of the car rotatably carry the ends of drum 27. The chain drum 27 windably receives the brake actuating chain 35 which passes in a horizontal direction under floor 32 of the car to a conventional air brake mechanism (not shown).

Because the effective diameter of sprocket 23 is substantially larger than that of the chain drum 27, these components function as a tension multiplier. Pulling tension applied to the chain 18 compresses the spring 25 and rotates both the sprocket 23 and the chain drum 27. An increased amount of tension is consequently applied to the brake actuating chain 35 due to the action of the tension multiplier comprising sprocket 23 and drum 27.

The manner in which torque applied to the hand wheel 14 is converted initially into pulling tension on the chain 18 is shown in FIGURES 3 and 4 of the drawings. The hand wheel 14 includes a hub 39 which is located on a conical portion of a shaft 40. The shaft 40 is held by a front bushing 41 located in the housing 12 and a rear bushing 43 located in a backplate 45. A pinion gear 46 is mounted for free rotation on the shaft 40 and includes gear teeth which are engaged with the gear teeth on a driven gear 50. A worm gear portion of the shaft 40 is in threaded engagement with the internal threads of a clutch member 52. A driving ring 54 is sandwiched between the clutch member 52 and the outwardly extending circular flange on pinion gear 46. Clutch pins 56 engage with the pinion gear 46 and the clutch member 52 causing them to rotate together on the shaft 40. As shown in FIGURE 4, a pawl 58 mounted on a shaft 59 engages with teeth in the driving ring 54 to form a ratchet.

The driven gear 50 is mounted on a shaft 60 along with a chain sprocket 62. Both driven gear 50 and sprocket 62 are fixedly mounted to the shaft 60 such that rotation of the driven gear 50 causes rotation of the sprocket 62.

Clockwise rotation of the hand wheel 14 and consequent rotation of the shaft 40 causes the clutch member 52 to be threaded rearwardly to engage the clutch. This occurs when clutch member 52 and pinion gear 46 are drawn together to clamp the driving ring 54. Thereafter, rotation of the shaft 40 rotates pinion gear 56, the driven gear 50, and the sprocket 62. The pawl 58 prevents counterclockwise rotation of the driving ring 54, thereby holding chain 18 in tension even though torque is removed from hand wheel 14.

To release the brake, the hand wheel 14 is rotated in the counterclockwise direction causing clutch member 52 to release the driving ring 54. The clutch is disengaged only temporarily, however, since the tensioned chain 18 rotates the driven gear 50, rotating the pinion gear 46 and the clutch member 52 with respect to shaft 40, again engaging the clutch. Chain 18 is therefore released by the rotation of sprocket 62 only by an amount proportional to the counterclockwise rotation of the hand wheel 14.

The basic clutch and gear drive mechanism shown in FIGURES 3 and 4 of the drawings is conventional, being modified in that the sprocket 62 replaces the chain drum which is normally mounted on the shaft 60 and in that the housing 12 is modified to provided a chain receptacle shown generally at 63. A pin 64 affixed to the end of chain 18 prevents the chain 18 from being payed out completely.

Figure 5:
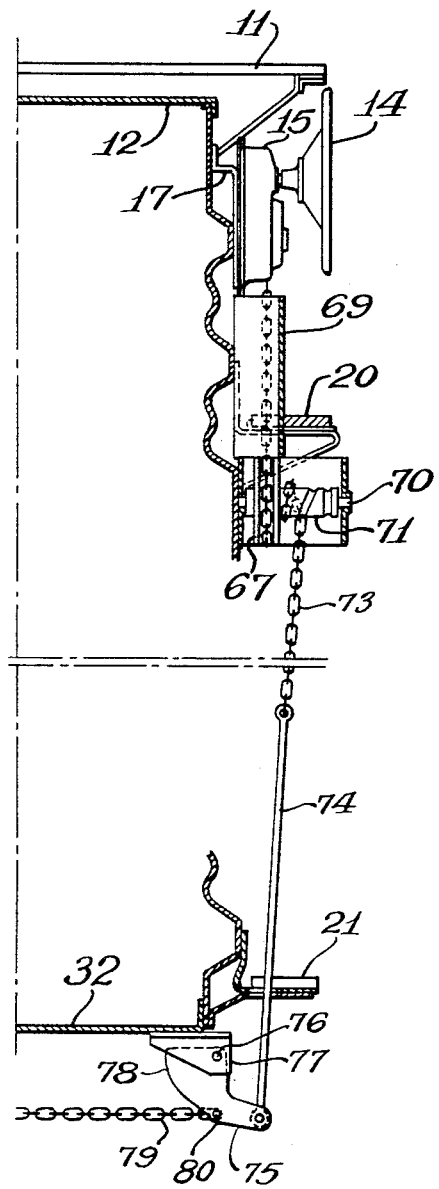
FIGURE 5 is a side, cross-sectional view of a second cable tensioning arrangement embodying the principles of the invention.
Figure 6:
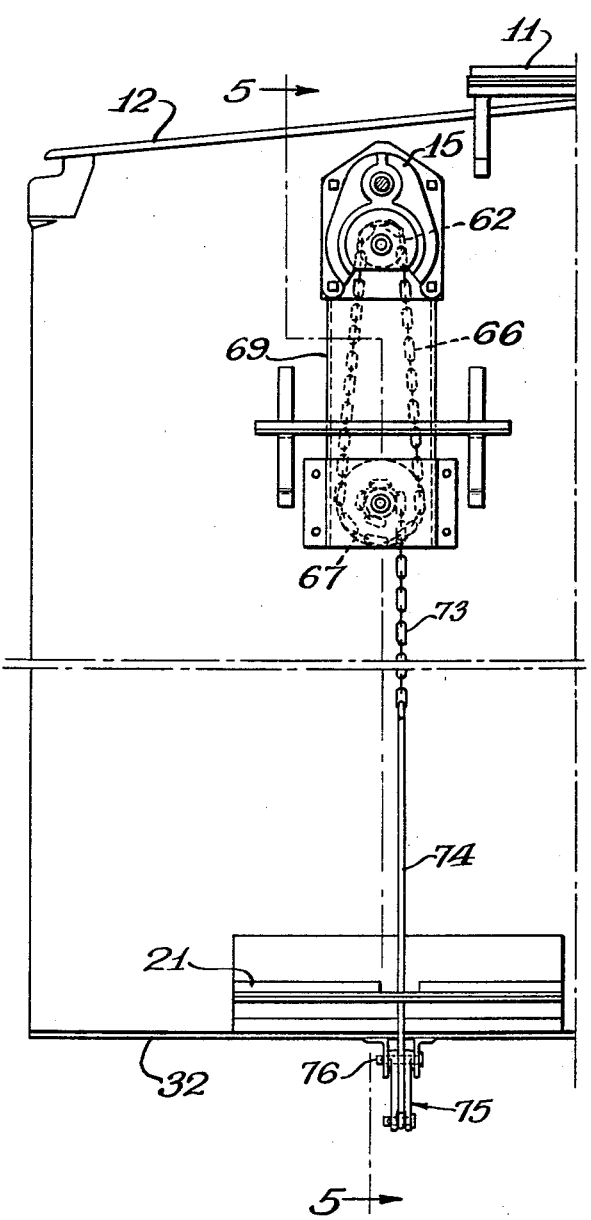
FIGURE 6 is an end view of the car and cable tensioning arrangement shown in FIGURE 5.

FIGURES 5 through 8 of the drawings illustrate another embodiment of the invention using the basic hand wheel, clutch and gear train arrangement shown in the embodiment of FIGURES 1 through 4 and like reference numerals have been used to designate like components in the different sets of figures. As shown in FIGURES 5 and 6, the hand wheel 14 and housing 15 are mounted in approximately the same position as before at the brake end of the car on the bracket assembly 17. The embodiment shown in FIGURES 5 through 8 possesses several significant advantages. The housing 15 does not require the chain pocket 63 employed in the embodiment pictured in FIGURES 1 through 4, but rather uses a chain loop 66 which engages with the sprockets 62 and 67. The housing 15 may accordingly be of conventional manufacture and does not require replacement. The chain sprocket 67 is mounted immediately below the housing 15 to produce a more unified construction. The sprocket 67 is of larger effective diameter than the sprocket 62 and is positioned below the sprocket 62. A chain guard housing 69 surrounds the chain 66. The sprocket 67 mounts on a shaft 70 along with a chain drum 71. The sprocket 67 and the drum 71 are mounted together for mutual rotation on the shaft 70. Drum 71 includes angled grooves 72 adapted to windably receivev a brake actuating chain 73. The brake actuating chain 73 passes from the drum 71 and is affixed to one end of a rod 74 which passes through the brake step 21 to a bell crank shown generally at 75. The bell crank 75 is mounted on an axle 76 which is supported by a mounting bracket 77. Bell crank 75 is provided with an arcuate, recessed region 78 which windably receives a chain 79, the end of which is affixed to the crank 78 by the pin 80. Chain 79 passes to a conventional air brake mechanism (not shown).

The crank 75, axle 76 and bracket 77 may be of conventional manufacture and need not be replaced when this embodiment of the invention is incorporated into existing rolling stock.

As depicted in more detail in FIGURES 7 and 8 of the drawings, clockwise rotation of the hand wheel 14 causes counterclockwise rotation of the sprocket 62. The consequent movement of the chain loop 66 rotates sprocket 67 in a counterclockwise direction, winding the chain 73 onto the drum 71. In accordance with the principles of the invention, an increased amount of pulling tension is therefore applied to the brake actuating chain 73.

It is to be understood that the embodiments which have been described are merely illustrative of an application of the principles of the present invention. Numerous modifications may be made by those skilled in the art without departing from the true spirit and scope of the invention.

What is claimed is:

1. A mechanism for operating a railway brake, said mechanism comprising in combination: an actuating chain connected to said brake, a support frame, a chain drum and a first chain sprocket mounted together for mutual rotation on said frame, said first sprocket having a substantially larger effective diameter than said drum, means for mounting said chain drum to windably receive said actuating chain, a rotatable hand wheel, a second chain sprocket mounted on said frame, means for rotating said second sprocket in response to rotation of said hand wheel, and a second chain engaged with both said first and said second sprockets whereby rotation of said second sprocket rotates both said first sprocket and said drum to apply tension to said brake actuating chain and thereby to said brake.

2. An arrangement as set forth in claim 1 including a housing for said second chain sprocket, said housing including a chain pocket for receiving an end portion of said second chain, and spring means affixed to the other ends of said second chain for holding said second chain in tension against said first and said second chain sprockets.

3. The combination set forth in claim 2 wherein housing and said hand wheel are mounted on the end wall of a railway car and wherein said first sprocket and said chain drum are mounted below the floor of said car.

4. An arrangement as set forth in claim 1 wherein said second chain forms a loop between said first and said second sprockets.

5. A railway mechanism for operating a brake, said mechanism comprising, in combination: an actuating chain connected to said brake, a support frame, a chain drum and a first chain sprocket mounted together for mutual rotation on said frame, said first sprocket having a substantially larger effective diameter than said drum, means for mounting said chain drum to windably receive said actuating chain, a rotatable hand wheel, a second chain sprocket mounted on said frame, said second chain sprocket, said first chain sprocket, and said chain drum being mounted on the end wall of a railway car, means for rotating said second sprocket in response to rotation of said hand wheel, and a second chain engaging and forming a loop between said first and second chain sprockets whereby rotation of said second sprocket rotates both said first sprocket and said drum to apply tension to said brake actuating chain and thereby to said brake.

References Cited

UNITED STATES PATENTS

| | | | |
|---|---|---|---|
| 220,844 | 10/1879 | Jackman | 254—145 |
| 1,166,214 | 12/1915 | Horne et al. | 74—506 |
| 1,807,995 | 6/1931 | Marvel | 74—10.7 |

FRED C. MATTERN, JR., *Primary Examiner.*

F. D. SHOEMAKER, *Assistant Examiner.*